Jan. 11, 1944.   D. H. GRANT   2,338,932
FORAGE CUTTER
Filed Jan. 25, 1941   2 Sheets-Sheet 2

INVENTOR.
David H. Grant
BY Fred C. Matheny
ATTORNEY

Patented Jan. 11, 1944

2,338,932

UNITED STATES PATENT OFFICE 2,338,932

FORAGE CUTTER

David H. Grant, Seattle, Wash.

Application January 25, 1941, Serial No. 375,905

5 Claims. (Cl. 56—60)

My invention relates to machines for cutting and handling green forage crops such as grasses, grains and the like, and my present invention is an improvement on the machine disclosed in my prior patent, No. 1,932,660, issued October 31, 1933.

It is an object of my invention to provide a machine that will make it both possible and practical to convert green vegetation of this class into ensilage by partially cutting up such vegetation in the field at the time it is harvested and loading this partially cut vegetation directly into a rack so that it may be hauled to an ensilage cutter and the cutting up thereof completed and the green vegetation put into a silo without allowing any objectionable curing of the vegetation to take place.

Another object of my invention is to provide a combined mowing machine and loader having two sickle units positioned one above another for mowing green forage crops and cutting the stalks, stems or blades of the same into at least two pieces so that the vegetation will be easier to handle, said machine further having elevator means for delivering this cut vegetation directly into a rack.

Another object is to provide a forage crop cutter having two sickle units positioned one above another and having the upper sickle unit quickly and easily adjustable toward and away from the lower sickle unit and forwardly and rearwardly as respects the lower sickle unit.

Another object is to provide a forage cutter of this nature having improved and simplified means for elevating the cut vegetation.

Further objects are to provide cut up and elevating mechanism of this nature which is simple in construction, cheap to manufacture and reliable and efficient in operation.

The vegetation this machine is designed to handle is herein referred to as grass, it being understood that this term includes alfalfa, timothy, oats, vetch and all like vegetation commonly used for hay.

In the harvesting of grass it is common practice to mow the same, then allow it to cure in the sun and air, to form hay, and then to shock, stack or bale the hay after it has cured and dried. Some of the food value of this grass is lost in the drying and curing process. Much of this lost food value can be saved by preserving the green grass as ensilage but the problem of picking up the grass immediately after it is cut and of handling the long tangled grass and feeding it evenly through the ensilage cutter present considerable difficulty, it being apparent that the grass begins to cure and dry out and lose food value as soon is it is cut. My invention overcomes these difficulties by providing means connected with the mower for cutting up the grass as soon as it is moved into lengths short enough to be elevated easily and loaded compactly into a rack and fed easily and evenly to an ensilage cutter. I do not attempt to cut the grass up fine enough for ensilage with my machine but preferably cut each stalk or stem or blade into at least two pieces, thus preventing the grass from becoming a tangled mass and making it possible to elevate the grass easily and to dump the grass and feed it evenly to the cutter in unloading.

Other and more specific objects of the invention will be apparent from the following description taken in connection with the accompanying drawings.

In the drawings.

Like reference numerals designate like parts throughout the several views.

Figure 1:
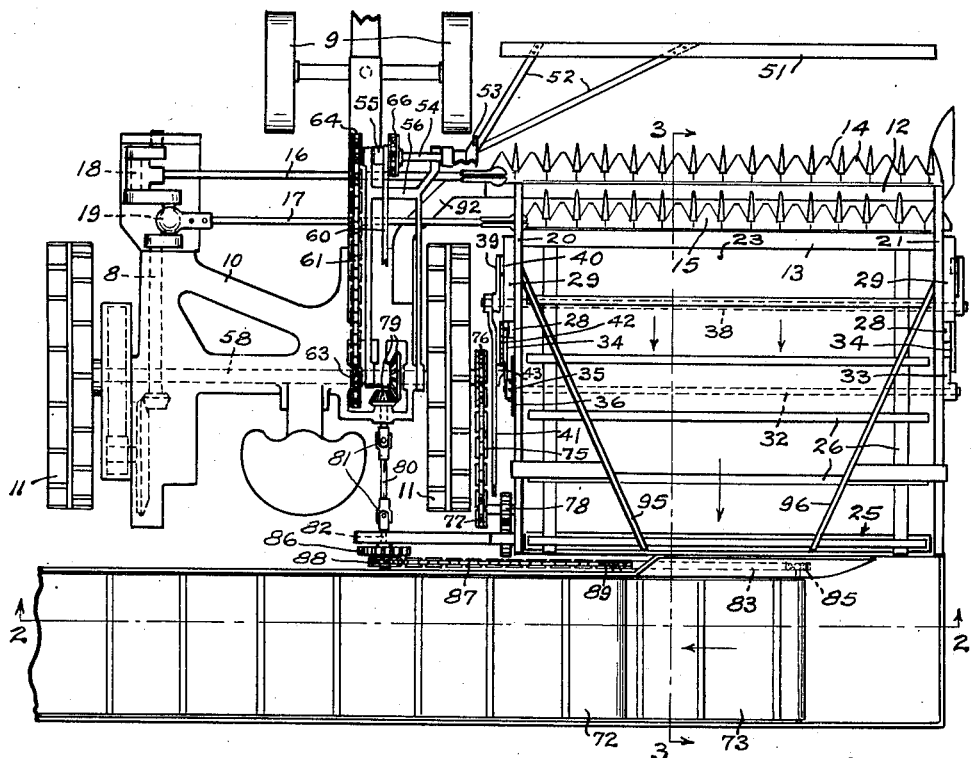
Figure 1 is a plan view of a mowing machine equipped with cutting and elevating mechanism constructed in accordance with my invention, parts of the reel being broken away.

The drawings show a mowing machine comprising a frame 10, mounted on wheels 11 and provided with a lower sickle bar 12 and an upper sickle bar 13. Sickles 14 and 15 of conventional form are carried by the respective sickle bars. Each sickle bar and its sickle are herein referred to as a sickle unit. I have shown two sickle units in this machine, but it will be understood that more than two may be used.

Two pitmans 16 and 17 connect the respective sickles 14 and 15 with crank members 18 and 19 on a shaft 8 for reciprocably moving said sickles.

Preferably the crank 19 is of ball type to compensate for the adjustment of the sickle bar 13 and sickle 15.

The shaft 8 is driven from the wheels of the mowing machine in the usual manner. Preferably all parts of the mowing machine are made heavier and stronger than the corresponding parts of an ordinary mowing machine to withstand the additional strain of my cutting and elevating means and to provide the tractive force necessary for driving. Preferably the tongue of the mowing machine is supported on trucks 9. Any suitable means such as a member 92 may be used to connect the lower sickle bar 14 to the frame 10.

Two plate like side frame members 20 and 21, positioned in substantially vertical planes, are rigidly secured to the lower sickle bar and extend rearwardly therefrom. The frame member 20 is positioned closely adjacent to the mowing machine and the frame member 21 is connected with the outer end portion of the sickle bar 14 and spaced outwardly from the frame member 20.

Transverse frame members 22 connect the two frame members 20 and 21 at the rear end and supports them in spaced apart parallel relation.

Figure 3:
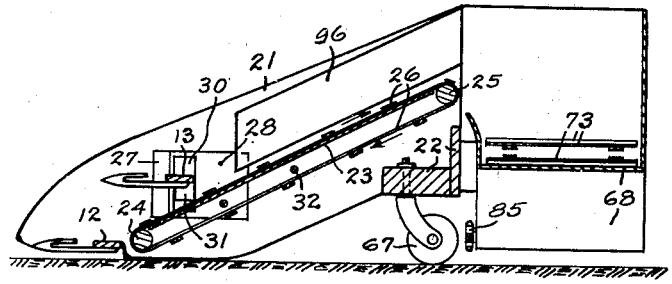
Fig. 3 is a sectional view substantially on broken line 3—3 of Fig. 1, with parts shown in elevation.

The side frame members 20 and 21 are inclined upwardly from front to rear, as shown in Fig. 3, and an elevator platform 23 preferably extends crosswise between these side frame members.

Two rollers 24 and 25, at least one of which is driven, extend crosswise between the frame members 20 and 21 adjacent the front and rear ends respectively of the platform 23.

A slat belt conveyor 26 is operatively disposed on the rollers 24 and 25 and platform 23 and is driven in the direction shown by the arrows in Figs. 1 and 3 by mechanism hereinafter described.

Figure 8:
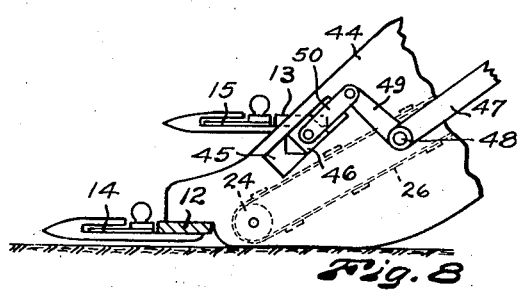
Fig. 8 is a fragmentary side elevation showing a modified form of sickle adjusting mechanism.

The upper sickle bar 13 is disposed parallel to the lower sickle bar 12 and above said lower sickle bar and rearwardly, from said lower sickle bar. This provides a stair step relation between the two sickle bars, as shown in Figs. 3, 5 and 8.

The upper sickle bar 13 is adjustably supported at both ends by means connected with the two frame members 20 and 21. The adjustable supporting means at the two ends of the upper sickle bar 13 is of duplicate construction and the following description will apply equally well to either end.

Figure 5:
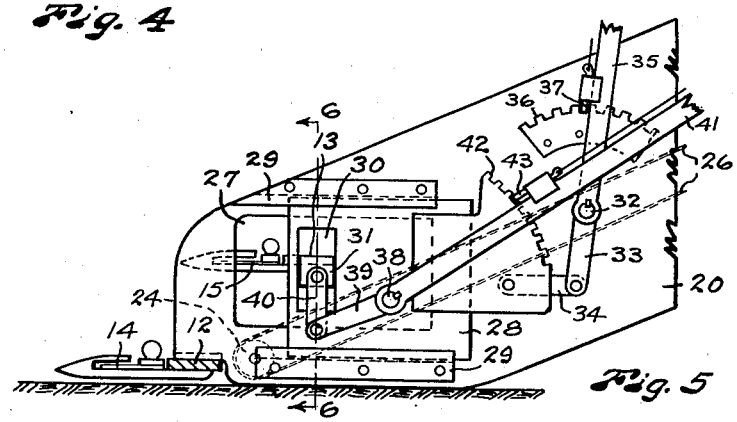
Fig. 5 is a fragmentary detached view in elevation, on a larger scale then Figs. 1 to 4, showing parts of the sickle adjusting mechanism.
Figure 6:
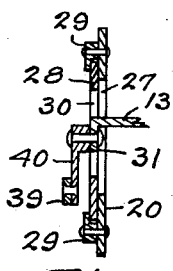
Fig. 6 is a fragmentary sectional view on line 6—6 of Fig. 5, showing parts of this sickle adjusting mechanism.

Each frame member 20 and 21 has an opening 27, Figs. 5 and 6, provided therein. Also each frame member 20 and 21 has a plate 28 adjustably secured to the outer side thereof by means such as two fixed guide members 29, Fig. 6, which hook over the top edge and the bottom edge of each plate 28.

Figure 9:
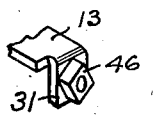
Fig. 9 is a perspective view of an end portion of the sickle bar shown in Fig. 8.

Each plate 28 has a vertical slot 30 therein. Each end of the sickle bar 13, see Fig. 9, has a downwardly extending portion 31 adapted to fit into one of the slots 30 and vertically movable in said slot 30.

The end portions 31 of the sickle bar 13 extend through the openings 27 in the frame members 20 and 21 and these openings 27 are large enough to permit the required amount of adjustment of the sickle bar 13. Also the pitman 17 operates through the opening 27 in the frame member 20.

The sickle bar 13 is adjustable vertically in the plates 28 and said plates 28 are adjustable horizontally on the frame members 20 and 21. This provides for both vertical and horizontal adjustment of the upper sickle bar 13 relative to the lower sickle bar 12. Both of these adjustments are desirable in taking care of vegetation of varying heights.

To provide for adjusting the plates 28 and sickle bar 13 forwardly and rearwardly on the frame members 20 and 21 I provide a cross shaft 32 connected with each plate 28 by a lever arm 33 and a link 34. A hand lever 35 is secured to the end of the cross shaft 32 shown at the right in Fig. 1, so that this shaft may be moved rotatively to adjust the plates 28 forwardly or rearwardly. Hand lever 35 is held in different adjusted positions by a notched segment 36 engaged by a catch member 37 on the hand lever 35.

To provide for adjusting the sickle bar 13 vertically I provide another cross shaft 38 that is journaled in the plates 28 and extends through the openings 27 in the frame members 20 and 21. Short lever arms 39 on the shaft 38 are connected by links 40 with the end portions 31 of the upper sickle bar 13.

A hand lever 41 is secured to the shaft 38 for moving said shaft rotatively. A notched segment 42 is carried by one of the plates 28 and cooperates with a catch member 43 on the lever 41 to hold the lever 41 in any position into which it is adjusted.

Preferably both shafts 32 and 38 are positioned below the platform 23 where they will not interfere with the movement of the cut vegetation or with the operation of conveyor 26.

The adjustable mounting means above described supports the upper sickle bar 13 firmly at each end in such a manner as to prevent lost motion thereof under the strain and vibration to which it is subjected by reciprocation of the sickle 15, and at the same time provides for quick and easy adjustment of this sickle bar 13 either forwardly and rearwardly or vertically. Such adjustment is very desirable to adapt the device for cutting up grain or grass or like vegetation of different lengths.

In Fig. 8 I show an adjustable mounting of modified form for the upper sickle bar 13 by which said sickle bar 13 is moved angularly to adjust it either downwardly and forwardly or upwardly and rearwardly.

In said Fig. 8, I show a fragment of a frame member 44 which corresponds to the frame member 20 except that the opening 27 is omitted and the frame member 44 is provided with an inclined slot 45. The sickle bar 13 in this instance is provided at each end with a rectangular block 46, see Fig. 9, that is rigidly secured to the downturned end portion 31 of said sickle bar 13. Each block 46 is positioned at an angle corresponding to the angle of slot 45 and is guided in said slot 45. This mounts the sickle bar so that is movable in directions corresponding to the incline of the slot 45.

The means for moving the sickle bar shown in Fig. 8 comprises a hand lever 47 secured to a cross shaft 48. The cross shaft 48 has a rigidly secured short lever arm 49 near each end that is connected by a link 50 with the adjacent block member 46. Only the adjusting means at one end of the sickle bar is shown in Fig. 8, the mechanism at the other end being of duplicate construction. Angular movement of the hand lever 47 will angularly move the shaft 48 thereby moving short levers 49 and links 50 so as to adjust the sickle bar either forwardly and downwardly or upwardly and rearwardly, both ends of the sickle bar being moved at the same time.

The form of adjusting means shown in Fig. 8 makes it possible to dispense with the plates 28 and adjusting mechanism therefor. Obviously the incline of the slots 45 shown in Fig. 8 may be varied.

The stalks or stems of the vegetation will be cut off near the ground by the lower sickle 14 and these stalks or stems will be cut into two pieces by the upper sickle 15. All of these stalks or stems, after being cut, will fall onto the slat belt 26 and will be elevated and moved rearwardly thereby and discharged onto elevating and loading mechanism hereinafter described.

Figure 4:
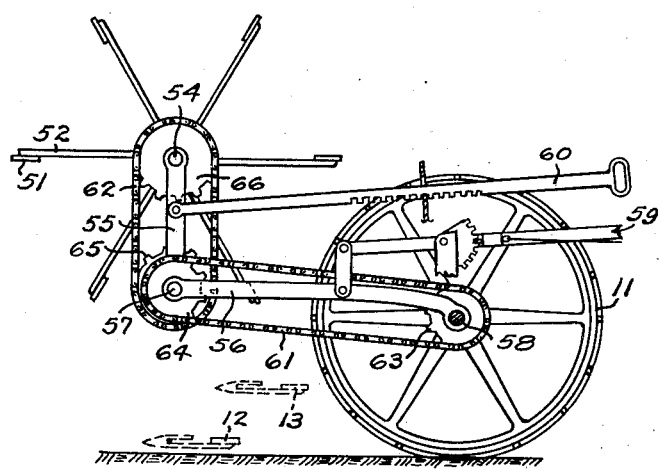
Fig. 4 is a detached elevation of the reel supporting and adjusting means shown in operative relation to a wheel and main shaft of the machine.
Figure 7:
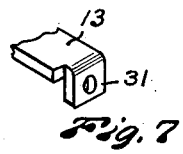
Fig. 7 is a fragmentary perspective view of an end portion of an upper sickle bar.

To assist in depositing the cut vegetation on the slat belt conveyor 26, I preferably provide a reel, shown partly broken away in Fig. 1, and better shown in Fig. 4.

This reel comprises slats 51 on arms 52 that are secured to a mounting plate 53 on a shaft 54. This reel is preferably supported for rotation by brackets 55 and 56 which are connected with each other by a pivot 57. The rear end portion of the bracket 56 is preferably mounted on the main shaft 58 of the mower. The front end portion of said bracket 56 is arranged to be raised and lowered by a lever 59 to adjust the reel vertically. The bracket 55 is arranged to be swung on the pivot 57 to adjust the reel forwardly and rearwardly. A link member 60 is provided for adjusting the bracket 55 and for holding it in any desired adjusted position.

The reel is driven from the main shaft 58 of the mower by link belts 61 and 62 operating on sprocket wheels 63, 64, 65 and 66.

Figure 2:
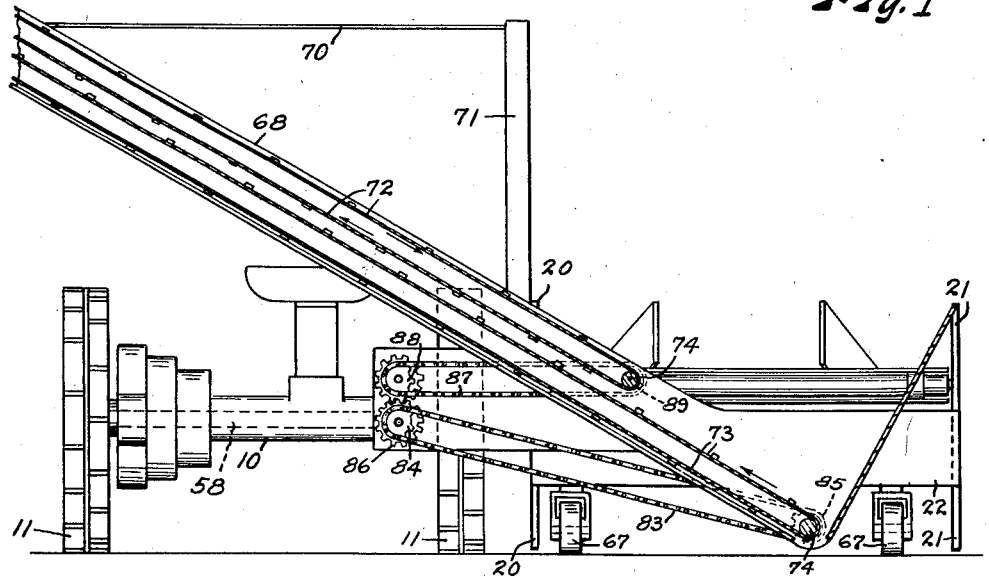
Fig. 2 is a view partly in rear elevation and partly in section of the same taken substantially on broken line 2—2 of Fig. 1, parts being omitted.

Preferably the rear end portion of the frame formed by side members 20 and 21 and cross bar 22 is carried on two caster wheels 67, see Figs. 2 and 3.

An elevator and loader frame 68 is secured to the rear end portion of the frame formed by parts 20, 21 and 22. Preferably the outer end portion of this elevator and loader frame 68 is supported by a truss rod 70 connected with an upright support 71.

Preferably two endless aprons 72 and 73 are mounted on rollers 74 in the elevator frame 68.

The lowermost endless apron 73 extends further to the right as respects the showing in Figs. 1 and 2 than the upper endless apron does.

This makes it possible to deliver the cut vegetation onto the portion of the lower endless apron that extends beyond the upper endless apron and then elevate such cut vegetation between the two endless aprons.

Two guide boards 95 and 96 are supported in vertical planes immediately above the slat belt conveyor 26. The guide boards 95 and 96 are secured to the frame members 20 and 21, a short distance to the rear of the upper sickle bar 13 and extend rearwardly in convergent relation to the discharge end portion of the slat belt conveyor 26. These guide boards 95 and 96 guide the cut vegetation and crowd it toward the center of the conveyor 26 as it is moved rearwardly by said conveyor and thereby help to deliver this cut vegetation in the correct position onto the lower endless apron 73.

All drives are preferably from the main shaft 58 of the mowing machine. The slat belt conveyor 26 is driven by a link belt 75 operating on sprocket wheels 76 and 77 and connected by gearwheels 78 with the rear roller 25 on which said slat belt conveyor 26 is carried. The sprocket wheel 76 is on the main shaft 58 of the mowing machine. The gearwheels 78 reverse the direction of rotation and move the slat belt 26 in the correct direction.

The drive means for the endless aprons 72 and 73 comprises bevel gears 79 on main shaft 58, auxiliary shaft 80 having universal joints 81 therein, shaft 82, and link belt 83 operating on sprocket wheels 84 and 85 to drive lower endless apron 73. Gearwheels 86 and link belt 87 operable on sprocket wheels 88 and 89 drive upper endless apron 72.

Operation

In the operation of this machine grass or like vegetation is cut off close to the ground by the lower sickle 14. All of the tall vegetation falls rearwardly or is brushed rearwardly by the reel slats 51 into the upper sickle 15 and is cut in two thereby. Some short vegetation may pass below the upper sickle bar. All of the vegetation will drop onto the slat belt conveyor 26 and be elevated and moved rearwardly thereby. The guide boards 95 and 96 will guide this vegetation toward the center of the conveyor 26 as it moves rearwardly and it will be discharged onto the endless apron 73 and elevated between endless aprons 73 and 72 into any suitable rack by which it may be hauled to an ensilage cutter where the cutting up of the vegetation is completed, and the same is stored in a silo.

This machine will cut the vegetation in two in the field, thus making it more compact and easier to load and unload and easier to feed to an ensilage cutter. This can be done with a machine which is not very heavy and which can be driven from the wheels of the machine and which can be operated with the power usually available on a small farm. This machine is not intended to cut the vegetation up fine enough to go into a silo and does not make it possible to eliminate the ensilage cutter.

My machine thus makes it possible to take the grass from a mowing machine as soon as it is cut and make ensilage of such grass with a minimum of time and effort.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a forage cutter, a conveyor; two spaced apart upright frame members forming sides for said conveyor; a lower sickle unit supported at the forward end of said conveyor; two plate members supported for longitudinal adjustment on said frame members; means including a lever operable by the driver while the machine is in motion for adjusting said plate members; an upper sickle unit positioned above and to the rear of said first mentioned sickle unit, the end portions of said upper sickle unit being supported for vertical adjustment in said plate members; and means including a lever operable by the driver while the machine is in motion for vertically adjusting the ends of said upper sickle unit in said plate members.

2. The combination with a mowing machine embodying a frame mounted on two wheels and having a sickle bar that extends sidewise from the wheels and the frame in front of the wheels; of a conveyor rigidly connected with said sickle bar and extending upwardly and rearwardly from said sickle bar at the side of the wheels; a second sickle bar extending across the forward end portion of said conveyor frame above said conveyor and parallel to said first mentioned sickle bar and spaced a short distance above and a short distance to the rear of said first mentioned sickle bar, a sickle reciprocably disposed in each of said sickle bars; an elevator and loader extending across the rear end portion of the machine at an upward incline with its lowermost end positioned to receive cut vegetation from said conveyor and its uppermost end positioned to deliver cut vegetation into a rack, and driving means connected with said conveyor and said elevator and loader.

3. In a machine for mowing and cutting up green forage, frame means; a driven reciprocable sickle unit carried by said frame means in close proximity to the ground operable to mow green forage; and another driven reciprocable sickle unit carried by said frame means relatively close to said first named sickle unit and in stepped relation above and to the rear of said first named sickle unit and at a height substantially less than the average height of the green forage to be mowed and operable closely behind and above said first named sickle unit to cut through the green forage immediately after said forage has been mowed by said first named sickle unit.

4. In a machine for mowing and cutting up green forage, frame means; a driven reciprocable sickle unit carried by said frame means in close proximity to the ground operable to mow green forage; and another driven reciprocable sickle unit carried by said frame means relatively close to said first named sickle unit and at a height substantially one half the average height of the green forage to be mowed and operable closely behind and above said first mentioned sickle unit to cut through the green forage substantially mid way between the top and bottom of said green forage immediately after said green forage has been mowed by said first mentioned sickle unit and regardless of whether said green forage tends to fall rearwardly or tends to stand as a tangled mass after being mowed by said first named sickle unit.

5. In a machine for mowing and cutting up green forage, frame means; a driven reciprocable sickle unit carried by said frame means in close proximity to the ground and operable to mow green forage; another driven reciprocable sickle unit carried by said frame means relatively close to said first named sickle unit and in stepped relation above and to the rear of said first named sickle unit and at a height substantially less than the average height of the green forage to be mowed and operable closely behind and above said first named sickle unit to cut through the green forage immediately after said forage has been mowed by said first named sickle unit regardless of whether said green forage tends to fall rearwardly or tends to stand as a tangled mass after being mowed by said first named sickle unit; and adjusting means including a lever readily operable by the driver while the machine is in motion adapted to adjust said last named sickle unit vertically and horizontally relative to said first named sickle unit.

DAVID H. GRANT.